March 17, 1925.  1,530,411
S. RESTCHAK
STRAINING ATTACHMENT FOR CREAM SEPARATORS
Filed Oct. 11, 1923
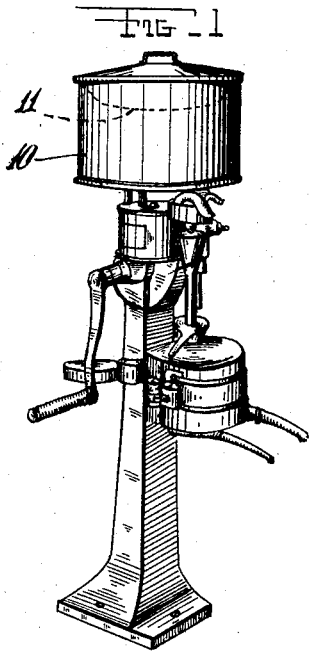
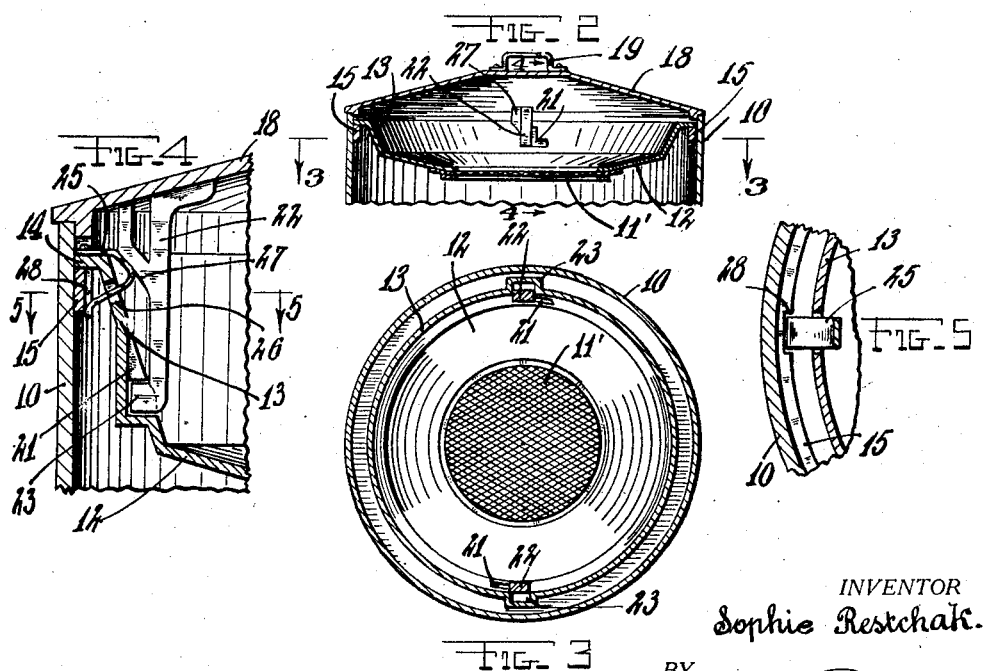
INVENTOR
Sophie Restchak.
BY
ATTORNEY Patented Mar. 17, 1925.

1,530,411

UNITED STATES PATENT OFFICE.

SOPHIE RESTCHAK, OF EXELAND, WISCONSIN.

STRAINING ATTACHMENT FOR CREAM SEPARATORS.

Application filed October 11, 1923. Serial No. 667,923.

*To all whom it may concern:*

Be it known that I, SOPHIE RESTCHAK, a citizen of the United States, residing at Exeland, in the county of Sawyer and State of Wisconsin, have invented certain new and useful Improvements in Straining Attachments for Cream Separators, of which the following is a specification.

This invention relates to cream separators, having more particular reference to a screening or straining attachment adapted to be placed as desired in the bowl of the separator to remove foreign objects that might accidentally get into the milk, the invention having for an object the provision of a novel straining attachment of simple construction.

For further comprehension of the invention, and of the objects and advantages thereof, reference will be had to the following description and accompanying drawings, and to the appended claims in which the various novel features of the invention are more particularly set forth.

Fig. 1 of the drawing is a perspective view showing a separator with my improved screening attachment applied thereto.

Fig. 2 is a fragmentary axial vertical sectional view of the bowl.

Fig. 3 is a horizontal sectional view taken on the line 3—3 of Fig. 2.

Fig. 4 is a detail vertical sectional view taken on the line 4—4 of Fig. 2.

Fig. 5 is a fragmentary axial sectional view taken on the line 5—5 of Fig. 4.

Referring now to the drawing the reference numeral 10 indicates the bowl of a separator of usual construction which receives the milk from which the cream is to be separated.

Within this bowl, a short distance from the top thereof, I position a straining element which is indicated generally at 11 in Fig. 1 and which consists of a suitable meshed central member 11′ through which the milk passes, and which is fixed at its edge in an annular member or ring 12. At its outer edge this ring is formed with an upwardly and outwardly flared wall element 13 on the upper end of which is an outwardly projected horizontal flange 14 which rests on a horizontal rib 15 in the bowl.

The bowl is provided with a cover 18 which rests freely on the top thereof and which is provided with a handle 19 for removal purposes. This cover is arranged to be connected to, or disconnected from the strainer element 11 so that the two may be lifted as a single unit when desired.

To this end the flared wall element 13 has a pair of bayonet grooves 21 pressed outwardly therein, the outer walls of the upwardly extending portions of said grooves being vertical, that is to say parallel with one another. Depending from the cover 18, adjacent the sides thereof, are fingers 22 which have outturned lugs 23 on their lower ends adapted to be inserted downward through the upstanding legs of the bayonet grooves 21 when the cover is placed on the bowl, and to be engaged in the horizontal legs of said grooves, by a slight turning movement of the cover, when the strainer is to be lifted with the latter.

To ensure against the strainer element 10 turning in the bowl with the cover 18 I attach to the top flange 14 thereof a pair of spring tongues such as 25 which project first inwardly, and then downwardly and outwardly through slots such as 26 in the element 13, and are adapted to be pressed by cam elements such as 27 on the fingers 22 into notches such as 28 formed in the rib 15 on which the strainer is supported while in the bowl.

Having thus described my invention what I claim as new and desire to protect by Letters Patent of the United States is as follows:—

1. In a separator, a bowl, a strainer element therein presenting a frusto-conical side wall element formed with bayonet grooves entering from the top downward, and a cover having depending fingers adapted to engage in said grooves.

2. In a separator, a bowl, a strainer element therein presenting a frusto-conical side wall element formed with bayonet grooves entering from the top downward, and a cover having depending fingers adapted to engage in said grooves, and means adapted to be engaged by said fingers for holding the strainer against turning movement in the bowl.

3. In a separator, a bowl, a strainer element therein presenting a frusto-conical side wall element formed with bayonet grooves entering from the top downward, and a cover having depending fingers adapted to engage in said grooves, and means adapted to be engaged by said fingers for holding the strainer against turning movement in the bowl, said means including resilient tongues fixed at one end to the strainer and having their other ends adapted to engage in notches on the inside of the bowl.

4. In a separator, a bowl, a strainer element therein presenting a frusto-conical side wall element formed with bayonet grooves entering from the top downward, and a cover having depending fingers adapted to engage in said grooves, and means adapted to be engaged by said fingers for holding the strainer against turning movement in the bowl, said means including resilient tongues fixed at one end to the strainer and having their other ends adapted to engage in notches on the inside of the bowl.

In testimony whereof I have affixed my signature.

SOPHIE RESTCHAK.